United States Patent
Yuen (10) Patent No.: US 12,466,556 B2
(45) Date of Patent: Nov. 11, 2025

(54) DETACHABLE, SELF-BALANCING, MULTI-PAYLOAD DELIVERY POD FOR UAV

(71) Applicant: Skycart Inc., Tracy, CA (US)

(72) Inventor: Lu Ru (Simon) Yuen, Tracy, CA (US)

(73) Assignee: Skycart Inc., Tracy, CA (US)

( * ) Notice: Subject to any disclaimer, the term of this patent is extended or adjusted under 35 U.S.C. 154(b) by 0 days.

(21) Appl. No.: 18/470,336

(22) Filed: Sep. 19, 2023

(65) Prior Publication Data

US 2024/0010337 A1 Jan. 11, 2024

Related U.S. Application Data (63) Continuation of application No. PCT/US2022/022047, filed on Mar. 25, 2022.

(51) Int. Cl.
| | | |
|---|---|---|
| B64D 1/12 | (2006.01) | |
| B64D 1/10 | (2006.01) | |
| B64D 9/00 | (2006.01) | |
| B64U 101/64 | (2023.01) | |

(52) U.S. Cl.
CPC ............ *B64D 1/12* (2013.01); *B64D 1/10* (2013.01); *B64D 9/00* (2013.01); *B64U 2101/64* (2023.01)

(58) Field of Classification Search
CPC ... B64D 1/00; B64D 1/02; B64D 1/06; B64D 1/08; B64D 1/10; B64D 1/12; B64D 9/00; B64U 2101/60; B64U 2101/64; B64F 1/32
See application file for complete search history.

(56) References Cited

U.S. PATENT DOCUMENTS

| | | | |
|---|---|---|---|
| 11,542,038 B2* | 1/2023 | Jung | B66F 9/063 |
| 2016/0129998 A1* | 5/2016 | Welsh | B64U 20/92 244/12.3 |
| 2017/0305570 A1* | 10/2017 | Heinonen | G01G 19/00 |
| 2019/0072953 A1* | 3/2019 | Maheshwari | B64D 9/003 |
| 2021/0163126 A1* | 6/2021 | Gray | B64U 30/20 |

* cited by examiner

*Primary Examiner* — Joshua J Michener
*Assistant Examiner* — Arfan Sinaki
(74) *Attorney, Agent, or Firm* — Dhiraj Jindal; PATENT YOGI LLC (57) ABSTRACT

A detachable, self-balancing, pod for an unmanned aerial vehicle. The pod is configured to hold a plurality of different payloads, and to dynamically shift the location of these payloads in order to maintain an optimal center of mass (center of gravity) for the combination pod and UAV. The pod will have its own processor, as well as processor-controlled actuators to shift the payload location inside the pod to optimize balance, and to dispense the different individual payloads in different locations as directed.

10 Claims, 11 Drawing Sheets

Unmanned Vehicle Flowchart

Fig. 13

DETACHABLE, SELF-BALANCING, MULTI-PAYLOAD DELIVERY POD FOR UAV

CROSS REFERENCE TO RELATED APPLICATIONS

This application claims the priority benefit of PCT application PCT/US2022/022047, filed Mar. 25, 2022; PCT/US2022/022047 claimed the priority benefit of U.S. provisional application 63/166,149, filed Mar. 25, 2021, the entire contents of all are incorporated herein by reference.

BACKGROUND OF THE INVENTION

Field of the Invention

This invention is in the field of UAV and drone package delivery technology.

Description of the Related Art

In recent years, there has been an increased interest in using unmanned aerial vehicle (UAV, drone) technology for package delivery purposes. However, at present, such vehicles have limited capabilities.

BRIEF SUMMARY OF THE INVENTION

To fly properly, aircraft, such as UAV, must control their center of mass (center of gravity) during flight within certain parameters. Most prior art package-carrying UAV carry a single payload (package) close to the vehicle's center of gravity. Thus, the center of gravity of the UAV will remain roughly the same both while carrying the single package and after the single package has been dispensed.

The invention was inspired, in part, by the insight that although it is desirable to produce more capable UAV with an ability to carry multiple payload packages, each with a substantial weight relative to the weight of the UAV, this sort of configuration will produce center of mass problems. That is, the center of mass of a UAV carrying multiple payload packages of substantial weight can, absent corrective measures, substantially shift as its various payloads are delivered.

The invention was also inspired, in part by the insight that systems and methods to rapidly load a UAV with a plurality of different payloads is also desirable. Preferably such payloads could be provided in a "pod" that could be rapidly attached or detached from a given UAV.

The invention was also inspired, in part by the insight that the art would be advanced by providing an improved payload pod, capable of holding and dispensing multiple payloads, that could also automatically compensate for changes in the center of gravity of the pod (and thus the UAV that the pod was attached to) as packages were dispensed during a delivery run. This pod device should also ideally be configured for rapid attachment and detachment from a UAV. This pod device should also be designed with its own computer processor and software system so that it can coordinate its functions with the UAV's computer processor, and other computing systems such as cloud (internet) processors and servers.

Thus, in some embodiments, the invention may be multiple payload delivery system and method. The invention may utilize a capsule or pod enclosure that can be installed underneath (or picked up or dropped off) by a UAV, or alternatively installed inside of a UAV.

The invention helps improve the logistics capability of a UAV by maximizing the number of deliveries per mission. This reduces the amount of unmanned aircraft that are required to make deliveries, reduces the amount of air traffic in the sky, reduces the costs associated with having additional pilots in command, reduces the cost to maintain an unmanned aerial delivery system with a similar delivery scale, and reduces the cost per payload delivery.

DETAILED DESCRIPTION OF THE INVENTION

In this discussion, "center of mass" and "center of gravity" may be used interchangeably. Although many of the payloads discussed herein are anticipated to have weights between about 1 and 10 kilograms, these weights are not intended to be limiting, and indeed weights less than 1 kilogram, and weights considerably higher than 10 kilograms (e.g., 20, 50, 100, 500+ kilograms) are also contemplated.

Figure 1:
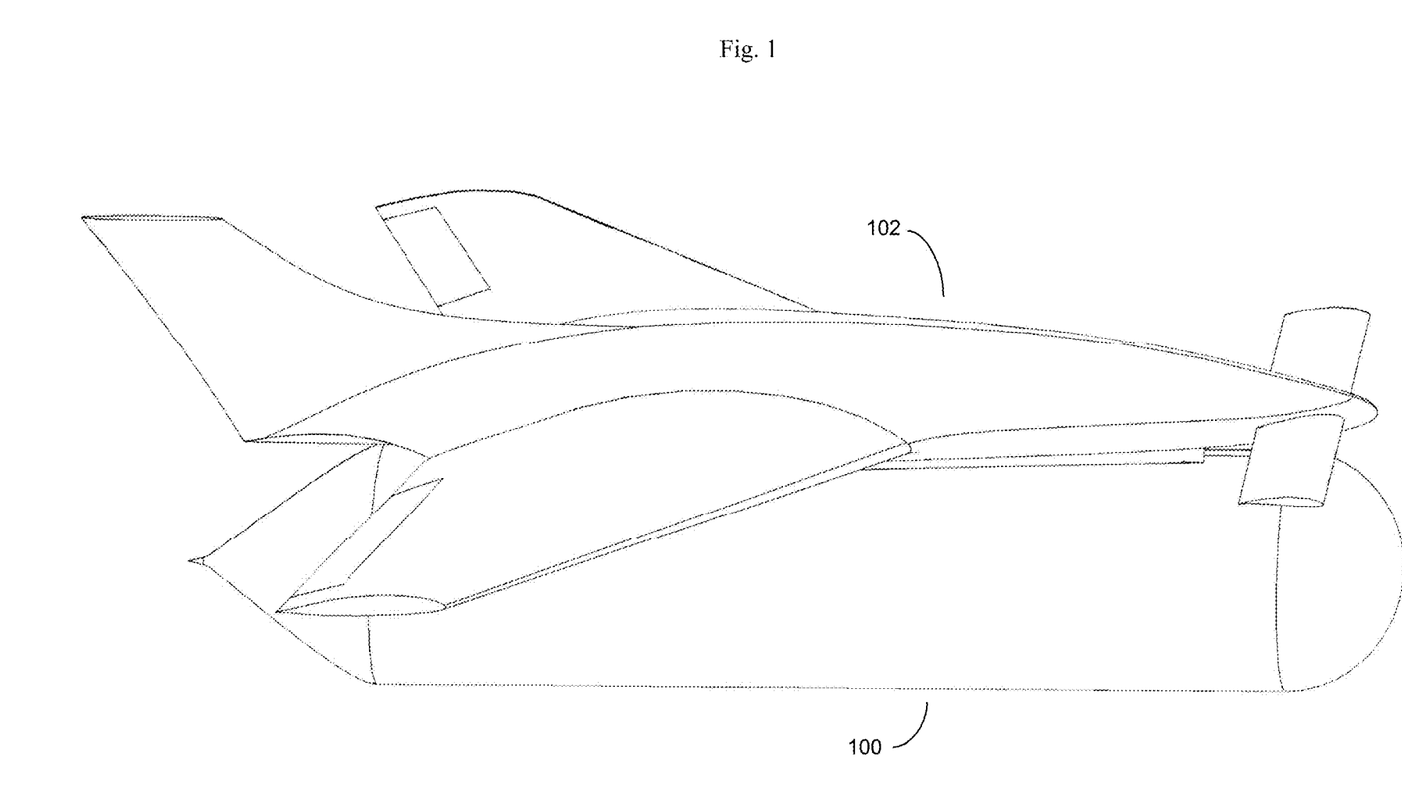
FIG. 1 shows an embodiment of the pod device attached to the outside of a UAV. In other embodiments, the pod device may be attached to the interior of a UAV.

As shown in FIG. 1, in some embodiments, the invention may be an unmanned aerial vehicle (UAV) pod device (100) configured to transport a plurality of independently dispensed payloads. These payloads are sometimes designated in the alternative as "packages".

The pod device will typically comprise a hollow shell, with an interior set of mechanisms the payload bay) configured to store at least one linear array of payloads. (In these examples, only one linear array is shown). This linear array of payloads constrained on either side (or at least one side) by at least one compacting end. Note that here, each linear array of payloads will have a having a major axis (108), and the system is configured to move the payloads back and forth along this major axis.

The pod device will typically also comprise at least one pod computer processor 136, such as a microprocessor/microcontroller, configured to obtain payload weight and linear array location information (e.g., the weight and location of any given payload along the major axis). The payload bay will typically further comprise a low friction payload support (such as rollers (118), and at least one pod processor controlled mechanical actuator (such as 126 b) configured to move the payloads forward and backward along the major axis (108) over the low friction payload support (118).

As will be discussed in more detail later in this disclosure, typically, the at least one pod processor is configured to use information pertaining to the weights and location of each of the various payloads to compute a present center of mass of the pod device. The system will typically also be configured to use this at least one pod processor controlled mechanical actuator (such as 126b) to move at least some of the payloads (e.g., 106a, 106b, 106c, 106d, etc.) along the major axis (108) to achieve a predetermined optimal center of mass.

FIG. 1 shows an embodiment of the pod device (100) attached to the outside of a UAV (102). In other embodiments, the pod device may be attached to the interior of a UAV.

Figure 2:
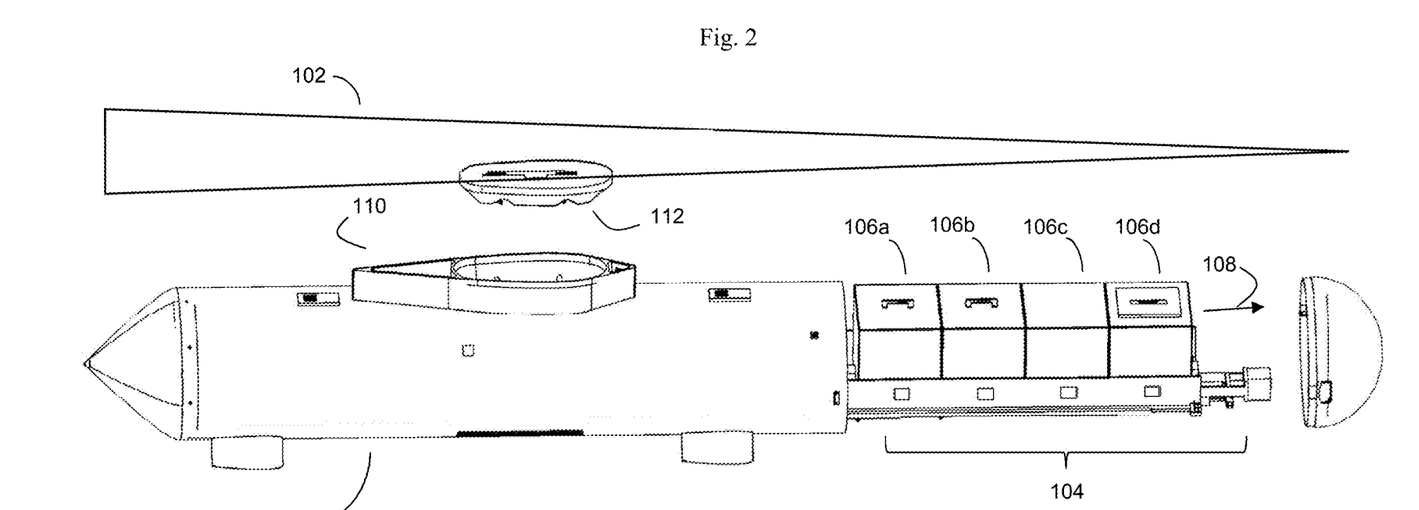
FIG. 2 shows top view of the pod device with the payload support partially removed from the payload bay, showing four payloads (square packages) disposed in a linear array. A detail of the rapid docking mechanism (the outer pylon and inner pylon) between the pod device and the UAV is also shown.

As shown in FIG. 2, in some embodiments, the pod device (100) may be configured with a rapid docking mechanism (110, 112) configured to enable the pod device (100) to rapidly attach and detach from the UAV (102).

In at least those embodiments configured to be attached to the exterior of a UAV, the pod device will have a "streamlined" exterior shape configured to reduce, and preferably minimize, aerodynamic drag. However alternate versions of the pod device may alternatively be configured to be mounted on the inside of a UAV.

In the figures, an embodiment where the payloads are placed on a single linear array is shown. However alternate embodiments, where the payloads are placed on more than one linear array, are not disclaimed. Indeed, with proper configuration and actuators, payloads may be placed in a 2D array, or even a 3D array.

Attaching the Pod to the UAV

In some embodiments, the pod and the UAV may be attached together using a pylon arrangement. Here, for example the pylon arrangement may consist of two pieces. This can be an outer pylon (110) on the pod, and an inner pylon (112) underneath the UAV (102). Inside the outer pylon are metal attachment points for the hooks of the inner pylon. When a UAV picks up a pod, its inner pylon will align with the pod's outer pylon as both pieces may be tapered to compensate for the lack of alignment precision. When the inner pylon is fully inserted into the outer pylon with the aircraft's downward velocity at zero, the hooks activate into a closed position. The hooks in the inner pylon activates to an open position when releasing the pod on the ground. The hooks may be actuated using a servo motor and gearbox.

Optional Active Alignment System

Figure 4:
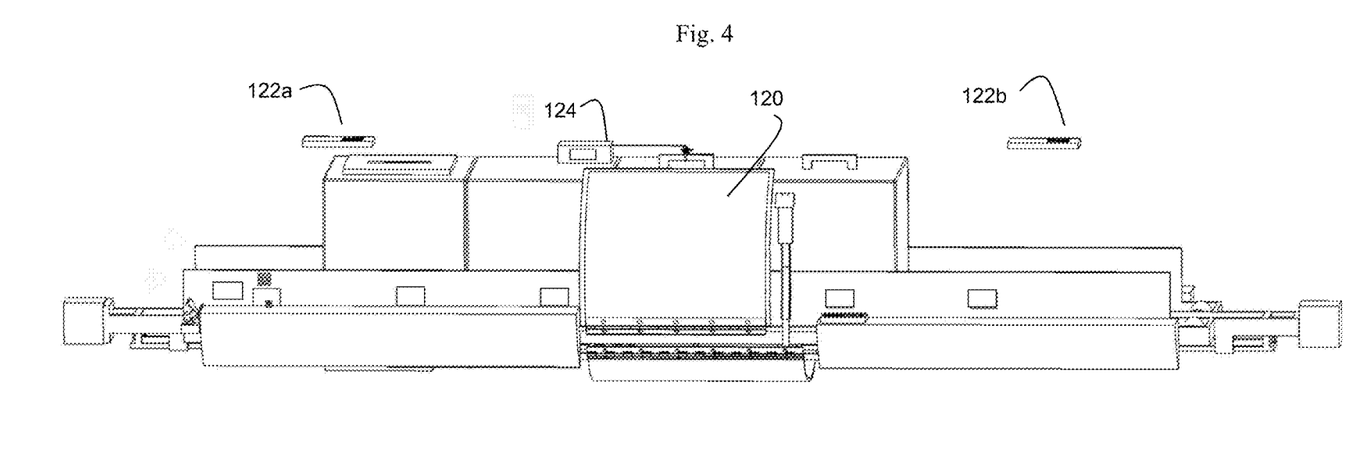
FIG. 4 shows a side view detail of the pod device's payload support and ancillary mechanisms, showing an optional side access hatch, optional illuminators or orientation lights, and an optional winch mechanism.

In some embodiments, an active alignment system may be used to help align the pod with a UAV. For example, in one embodiment, the top of the pod may have one or more (e.g., three) infrared or optical lights (122a, 122b) that point to the sky. One light may produce a pattern to identify the pod, and the other two lights may be used for pod and aircraft alignment. Cameras underneath the UAV may be are used to position the lights within the camera frame to establish precision alignment with the pod and pylons to facilitate the successful attachment of the UAV and pod.

FIG. 2 shows a top view of the pod device with the payload support (104) is partially removed from the payload bay (e.g., the hollow interior of the pod). FIG. 2 shows four payloads (square packages 106a, 106b, 106c, 106d) disposed in a linear array. The major axis of the linear array is also shown (108). A detail of a rapid docking mechanism (the outer pylon 110 and inner pylon 112) between the pod device and the UAV (102 previously shown in FIG. 1) is also shown.

Figure 3:
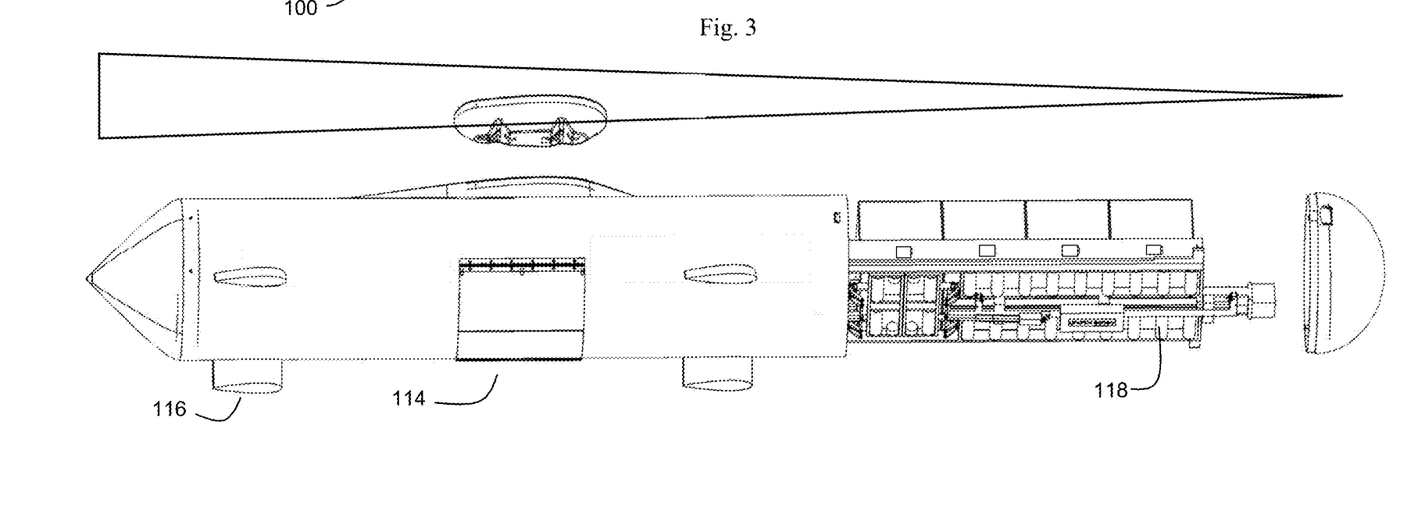
FIG. 3 shows a bottom view of the pod device shown in FIG. 2. Optional bottom payload doors (here in a shut configuration) and optional feet are also shown. The payload support can be configured for low friction by use of rollers or other mechanisms.

FIG. 3 shows a bottom view of the pod device shown in FIG. 2. Optional bottom payload doors (114, here in a shut configuration) and optional feet (116) are also shown. The payload support (104) can be configured for low friction movement of the payloads back and forth by use of rollers (118) or other mechanisms.

Although the pod device may receive information pertaining to the packages from any source, including cloud (internet) sources, in some embodiments, the pod device may further comprise at least one payload scanner connected to, or communicating with, the pod processor. This can be any type of scanner operating by any type of method, including optical scanning or imaging, magnetic scanning, RFID tag readers, NFC tag readers, etc. In such embodiments, the payloads (e.g., 106 a . . . 106 d) may themselves further comprise tags (132a, 132b, 132c, and 132d) reporting on at least the payload's weight (and often providing at least a payload tracking number as well). In these embodiments, the pod device may use these payload scanner(s) to read these payload tags, obtain at least the payload weight from the payload scanner, and communicate this payload weight to the pod processor.

FIG. 4 shows a side view detail of the pod device's payload support and ancillary mechanisms, showing an optional side access hatch (120), optional illuminators or orientation lights (122a, 122b), and an optional winch mechanism (124) for lowering payloads (packages). This particular embodiment is configured to handle up to six payload packages.

Figure 5:
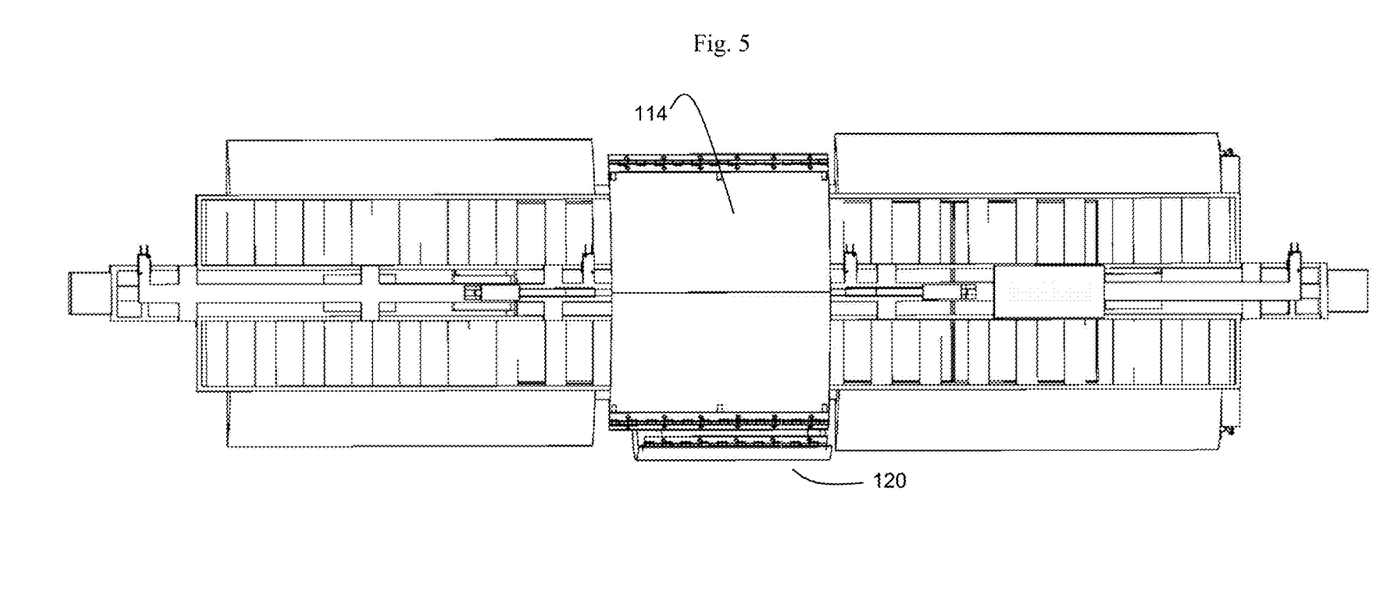
FIG. 5 shows a bottom view detail of the pod device's payload support previously shown in FIG. 4. Here the optional bottom payload doors are closed.

FIG. 5 shows a bottom view detail of the pod device's payload support previously shown in FIG. 4. Here the optional bottom payload doors (114) and the optional side access hatch (120) are closed.

Figure 6:
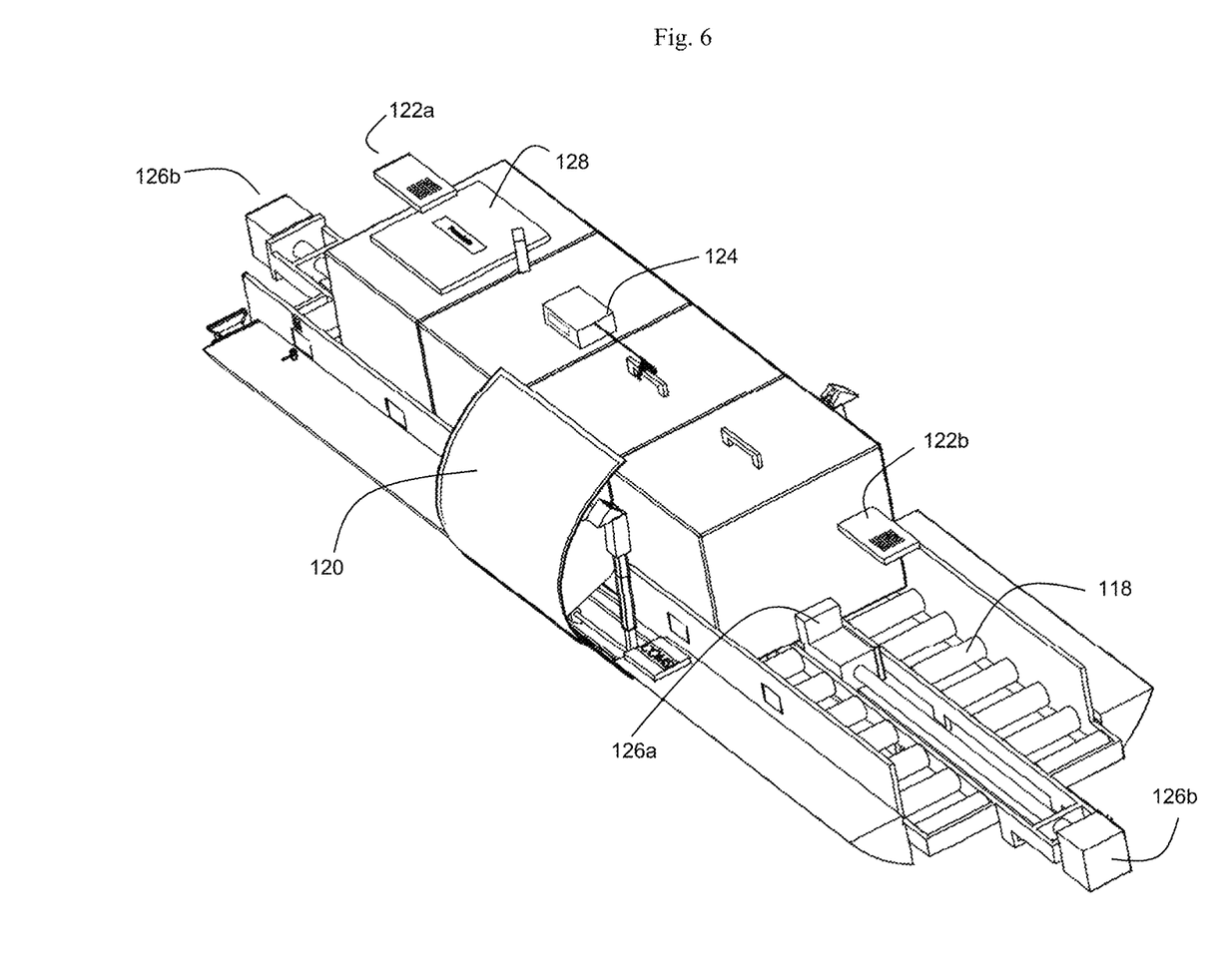
FIG. 6 shows a side top view detail of the pod device's payload support and ancillary mechanisms. Here compacting end mechanisms are also shown in more detail. The optional side access hatch is shown in a closed position.

FIG. 6 shows a side top view detail of the pod device's payload support and ancillary mechanisms. Here the compacting end mechanisms (126a, 126b) are also shown in more detail. Each compacting mechanism may comprise a package manipulator fixture (126a) and at least one processor-controlled actuator (126b). The optional side access hatch (120) is shown in a closed position. In some embodiments, some of the payload packages may be equipped with parachutes (128).

In some embodiments, the pod device will further comprise at least one compacting end (126a, 126b) configured in a first position to enable payloads to be packed in the payload bay, and configured in a second position to constrain movement of the payloads to movement along the major axis (108), as well as to help control a position of the payloads in the payload bay. Typically, the pod processor will use the compacting ends (126a), and associated processor controlled mechanical actuators (which may include 126b) to move the payloads back and forth along the major axis to achieve a desired center of mass. These same actuators, or other actuators, may also be used to position various payloads for dispensing from the pod.

Thus, in some embodiments, as will be discussed in more detail shortly, the at least one pod processor, and at least one pod processor controlled mechanical actuator, are further configured to a) push the payloads together, thereby producing compacted payloads; and also, b) move some or all of compacted payloads in the payload bay along the major axis to a desired location.

Figure 7:
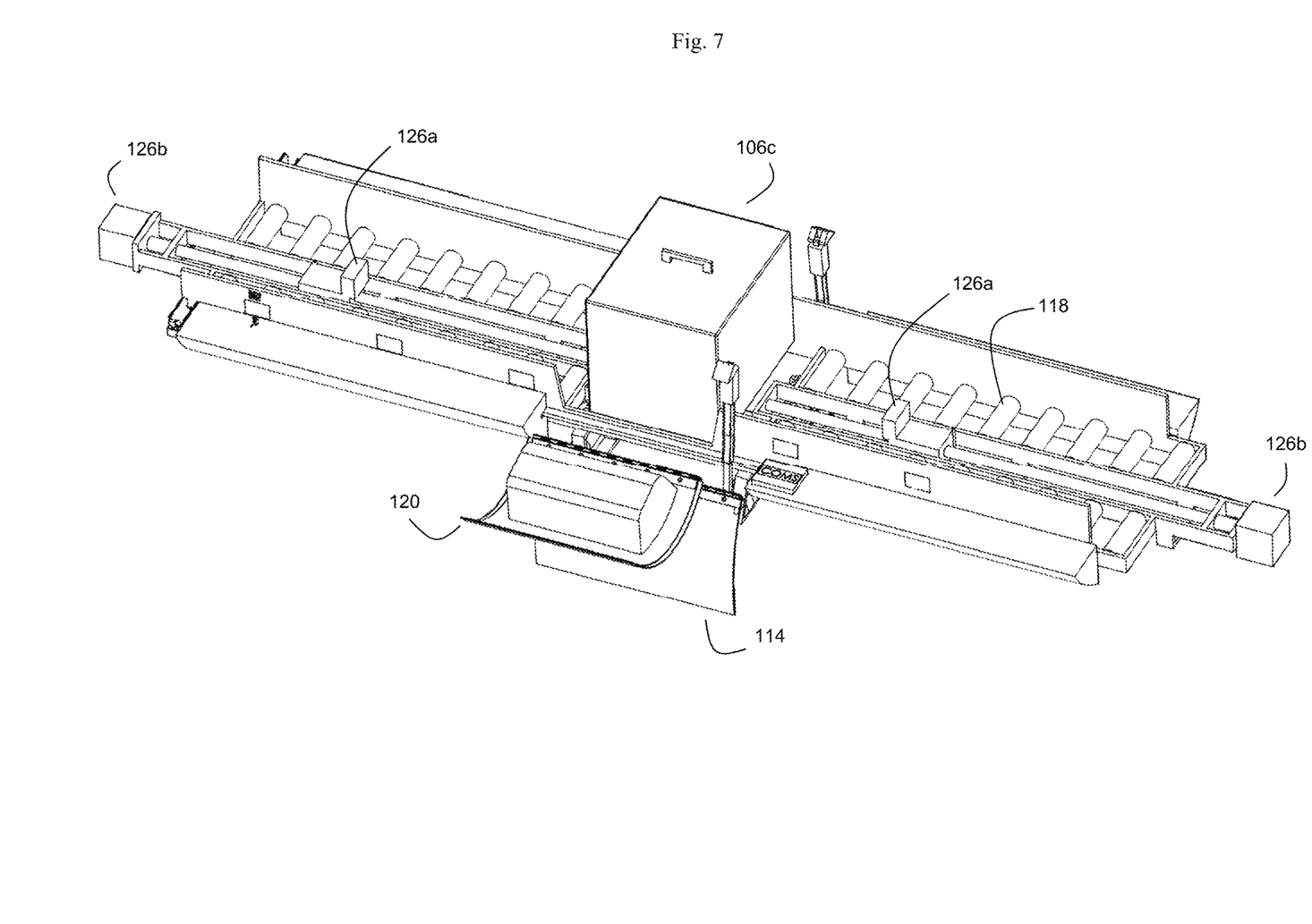
FIG. 7 shows a top view of the pod device's payload support, here with only one payload (square package) shown. The optional side access hatch is shown in an open position. The optional bottom payload doors are also shown in an open position. The compacting ends are shown in an open (non-compacting position). In normal operation, both compacting ends would be brought up against the remaining payloads to better control the location of the payloads, as well as to precisely control center of mass of the pod device.

FIG. 7 shows a top view of the pod device's payload support, here with only one payload (square package 106c) shown. The optional side access hatch (120) is shown in an open position. The optional bottom payload doors (114) are also shown in an open position. The compacting ends fixtures (126a) are shown in an open (non-compacting position). In normal operation, the compacting end fixture(s) (126a) would be brought up against the remaining payloads to better control the location of the payloads, as well as to precisely control the center of mass of the pod device (100) (as well the center of mass of the attached UAV 102).

In some embodiments, the pod device (100) will further comprise an automatic payload dispensing mechanism 130 configured to independently dispense any given payload. This automatic device may be as simple as a processor-controlled actuator that simply pushes a given payload out of a bottom opening (when payload doors 114 are open). Alternatively, more complex payload dispensing devices, that release safety catches, open and close payload doors, control winches, (124), etc. may also be used.

Often, after a given payload has been dispensed the center of mass of the pod may change due to a sub-optimal position of the remaining payloads. In a preferred embodiment, at any time, such as after dispensing a given payload, pod can then begin active measures to reset the center of mass to a more preferred setting. Here, for example, the at least one pod processor may be configured to use the various payload's weight and linear array location information to recompute the present center of mass of the pod device. The at least one pod processor can then compare this to a preset target value, and as needed, use the at least one pod processor controlled mechanical actuator(s), such as (126b) to move any remaining payloads back and forth along axis (108) to achieve a predetermined optimal center of mass.

Figure 8:
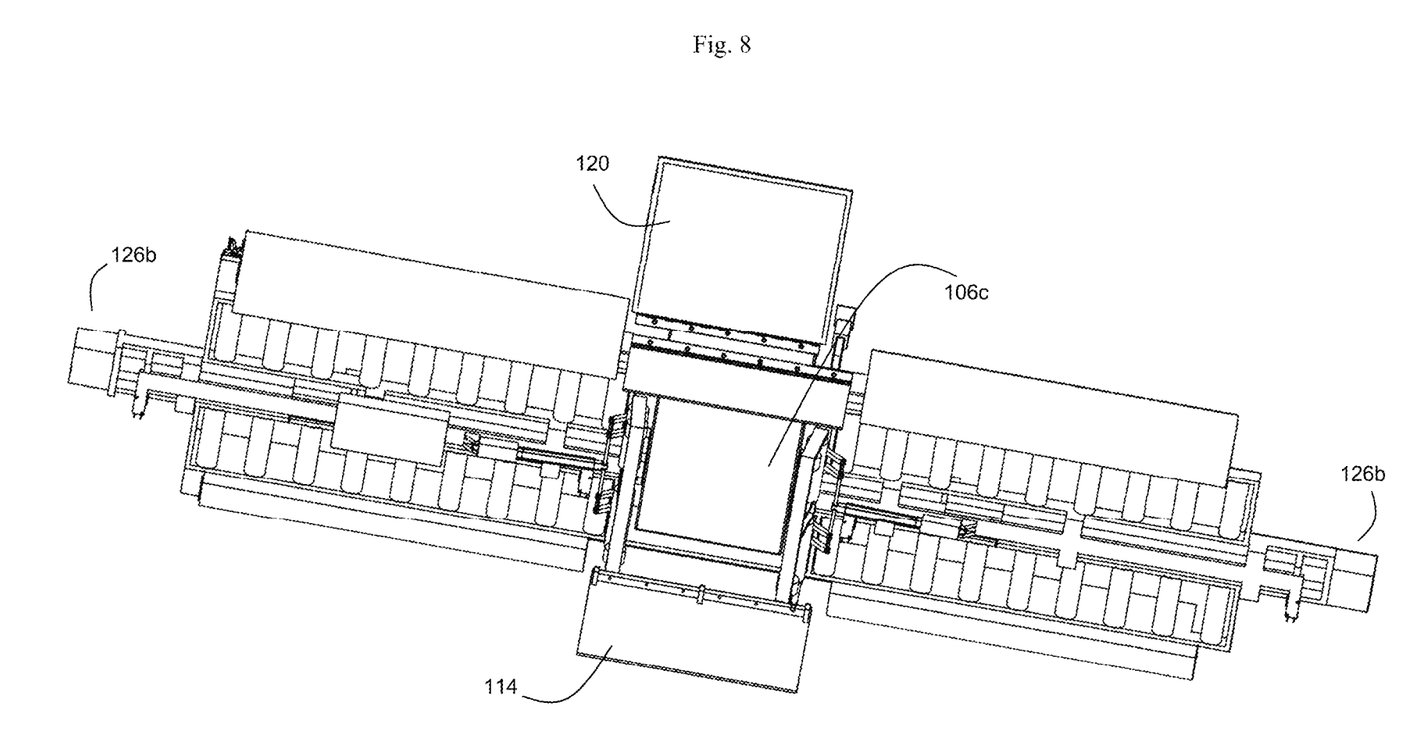
FIG. 8 shows a bottom view of the pod device's payload support previously shown in FIG. 7. Here the optional payload doors are open, and the underside of the payload (square package) previously shown in FIG. 7 is exposed. In operation, this payload would then be dispensed through this opening by the system's automatic payload dispensing mechanism.

FIG. 8 shows a bottom view of the pod device's payload support previously shown in FIG. 7. Here the optional payload doors (114) are open, and the underside of the payload (square package 106c) previously shown in FIG. 7 is exposed. In operation, this payload would then be dispensed through this opening by the system's automatic payload dispensing mechanism.

Figure 9:
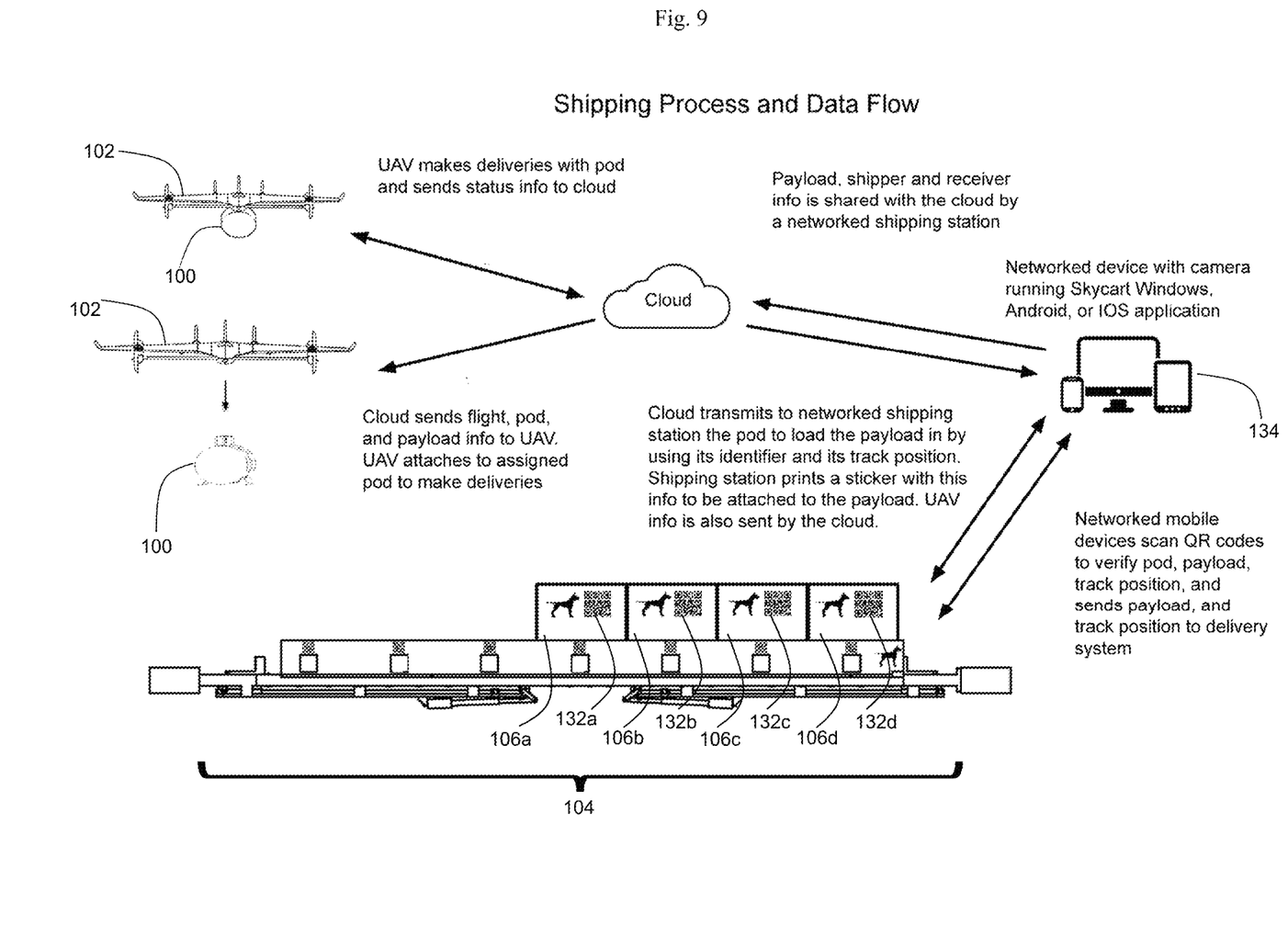
FIG. 9 shows a diagram of the shipping process and exchange of data during payload handling.

FIG. 9 shows a diagram showing one embodiment of the invention's shipping process and data flow, as per the following steps below Step 1) Payload preparer puts payload on a scale and selects shipper and receiver information stored in the cloud using shipping station software. Information about the payload is entered along with its weight. This information along with shipper and receiver information is sent to the cloud for shipment processing.

Step 2) The cloud sends back a pod identifier, a QR code for the payload, and a track position number. These items get printed on a large label using the shipping station's label printer.

Step 3) The printed label from the shipping station gets attached to the payload and placed on the track with the corresponding track position and pod identifier. The loader of the payload uses a mobile device 134 with a camera running mobile shipping client software to verify payload QR code against track QR code. This scanning process is repeated using the same mobile software by a supervisor and is signed off in a pre-flight check. Depending on the operation, this latter step may not be necessary. The pod is also sent payload information during the scanning process.

Step 4) Once payload checks have been completed; the pod is ready for deliveries. An unmanned aerial vehicle is allowed to ARM itself, if not already, depending on pod status. The unmanned aircraft starts its multiple delivery mission after payload information and navigation instructions are sent.

Step 5) The unmanned aircraft is attached to a pod ready for deliveries and carries out its programmed delivery mission.

Communicating with the UAV

Typically, UAV (102) includes at least one UAV processor. In some embodiments, this at least one UAV processor may be configured to communicate with the at least one pod processor. Here, the at least one pod processor can use information received from the at least one UAV processor to perform any of determining the predetermined optimal center of mass, and/or to dispense the payloads independently. This communication may be by wireless links, by direct optical or electronic wired links (for example, using data transfer cables or optical connections over outer pylon (110) and inner pylon (112), or by other means.

For example, assume that a standard pod is equipped to interface with different types of UAV, each with a different UAV center of mass. The optimum pod center of mass may thus differ depending on which UAV it is attached to, and thus the pod processor may reset its optimum center of mass depending on information received from the UAV. Further, the UAV may send information such as "drop package 106b now" to the pod processor, and the pod processor can in turn use this to activate the pod's payload dispensing mechanism.

Thus, in some embodiments, the one or more UAV processors may further communicate payload dispensing information to the at least one pod processor. The pod device may be configured to use this payload dispensing information independently dispense various payloads. This can be done by using the pod processor(s) and at least one dispensing actuator 131 dispense one or more payloads by either dropping the payloads (e.g., onto the ground from a short distance by a near-ground hovering or landed UAV), or by parachute (from a UAV further above the ground).

Alternatively, the dispensing mechanism may control a winch (124) that lowers the payloads gently to the ground or person, and then releases the payloads.

Further Discussion of the Payload Delivery System

In some embodiments, information about the payloads in the pod are may be communicated from a UAV or other wireless device and be stored in the pod processor memory.

The pod processor may then use this information to calculate the overall acceptable center of gravity with respect to the pod's center of gravity and the center of gravity of the UAV to maintain stable flight. The overall acceptable center of gravity is bound within the upper and lower limits of the UAV's center of gravity range for stable flight. This overall acceptable center of gravity is maintained and adjusted throughout every UAV mission, including payload loading, unloading, pickup and drop-off events.

Specific Example of a Payload Management System

In some embodiments, the mechanism by which an overall acceptable center of gravity is maintained comprises a system of software, microcontrollers, communication devices, rollers, rails, lead screw, payload compacting ends, stepper motors and drivers. The rollers, rails, lead screw, compacting ends, stepper motors, and driver's makeup the track system. When the unmanned aircraft is on the ground DISARMED, the compacting ends on the track system (126a) are often configured to be wide open to receive payloads.

As the compacting ends open wide, they reach the limits on both ends of the track system. When this happens, a signal may be sent by limit switches to the pod processor that the ends have reached track system limits and to back away from the limit switches. In addition, the limit switches may also be used to provide a way to calibrate the positioning accuracy of the track system. When the UAV is ARMED for flight, the compacting ends can then move into position to group and hold the payloads on the track system together at the overall acceptable center of gravity.

As illustrated, the pod's track system is numbered from 1 through 6 representing payload locations $p_n$. In this example, above each of the numbered locations 1 through 6 along the track system has a QR code. Locations 1-4 could, for example, be utilized for operations that need to deliver payloads quickly. Locations 5 and 6 are can be made available for deliveries of payloads don't have to be done quickly, and may require an operation that could incorporate the removal of the delivery track.

As the overall acceptable center of gravity is maintained by the delivery system throughout a UAV mission, a new overall acceptable center of gravity calculation is performed by the pod processor, and is preferably enforced immediately after a payload loading or unloading event. As previously discussed, the loading and unloading of payloads can be performed with the assistance of a person, machine, or released with a parachute, lowered by a line, or placed on the ground.

Center of Gravity Positioning

The pod processor can be one or more microprocessors or microcontrollers. The software running on the pod processor calculates the overall center of gravity, the positions of the compacting ends, and sends these positions as signals to the stepper motor drivers such as (126b). The stepper motor drivers then operate by, for example, moving lead screws to move the compacting ends (126a) to their required positions. The resulting positions of the compacting ends will always be to group and hold payloads together while maintaining the overall center of gravity during flight. The following equation determines where the overall center of gravity is located for n payloads with respect to the ideal center of gravity of an aircraft that is between the upper and lower limits of stability.

$$CG \text{ (in inches)} = \frac{W_n * p_{n-1} * d + W_4 * p_3 * d + W_3 * p_2 * d + W_2 * p_1 * d}{W_{pod} + W_1 + W_2 + W_3 + W_4 + W_n}$$

Where d is the length of the payload that is along the track system or along the aircraft's longitudinal axis, $p_n$ is the payload position on the track system, $W_{pod}$ is the weight of the pod, and $W_1$ $W_2$ $W_3$ $W_4$ and Wn are the payload weights at their corresponding $p_n$ locations.

Payload Verification Systems

In some embodiments, as each payload information is entered into a ground support computer along with its weight, the ground support computer may assign a location number to the payload. Here, a sticker or tag may be printed or otherwise generated, together with a track system location number, and a code, such as a QR code other type of tag code, that may be attached to the payload. After attaching the sticker or tag, to the payload, the payload can then be loaded onto the track at the corresponding location number.

In some embodiments, the payloads may be loaded manually, and other setup operations may also be done manually. For example, when a person loads a payload onto the track system, the person may scan both the QR code or other tag on the payload, and the corresponding QR code or other tag at the numbered track location, into a mobile device running suitable logistics tracking software. The logistics tracking software can then verify that the payload is in its proper track location, as well as in the correct UAV.

Before takeoff, the logistics tracking software can optionally also require a preflight verification of proper payload position and aircraft. The preflight check can includes scanning all payload QR codes or other tags, and their corresponding location QR codes or other tags. Preflight verification is optional for delivery of a single payload.

Payload System Diagram

Figure 10:
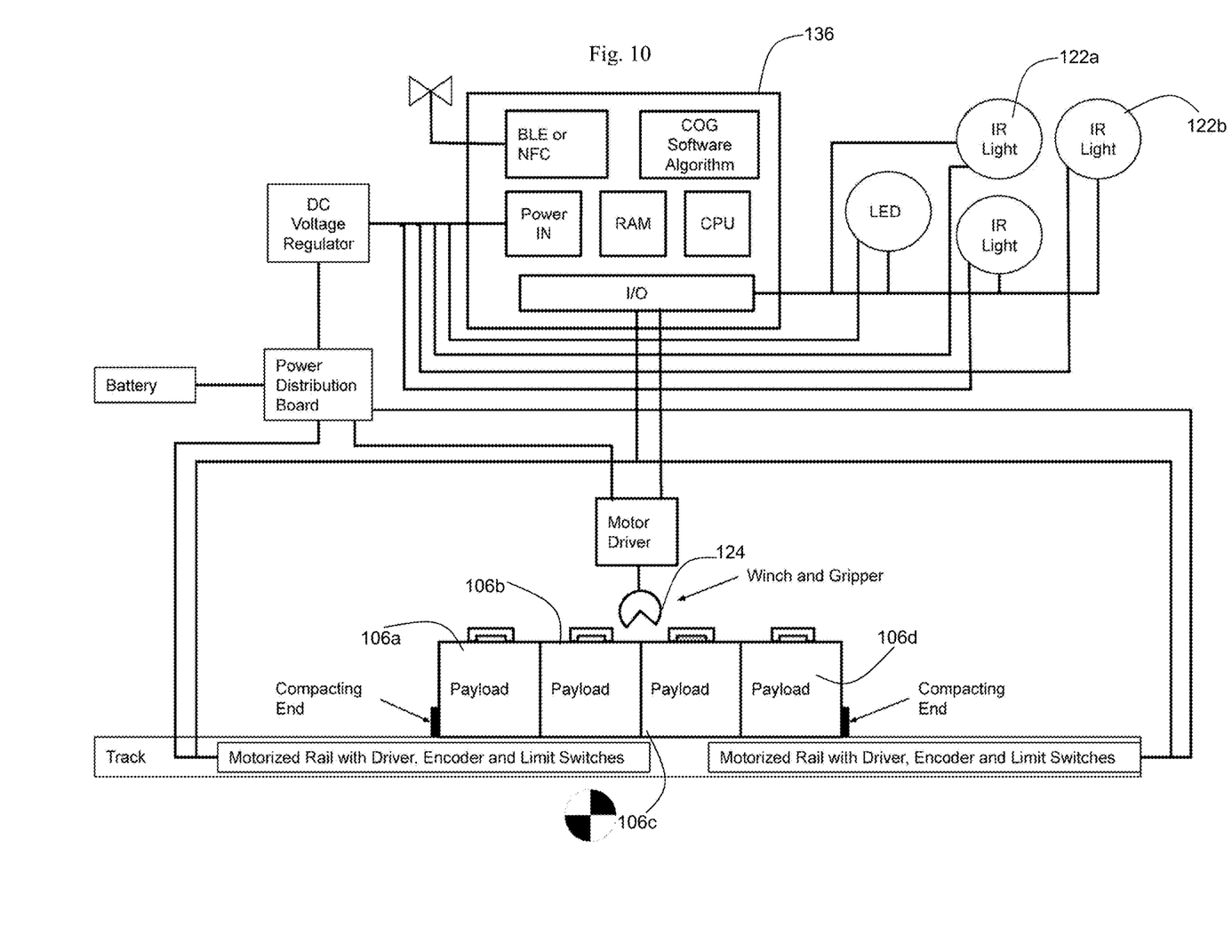
FIG. 10 shows a payload system diagram showing some of the electrical and software components of the system.

FIG. 10 shows a payload system diagram showing some of the electrical and software components of the system.

There are two possible locations in the pod where a wireless communications device can be found. One location is on the track system and the other is in the pylon. Various communication devices could be mounted in these locations. Currently the pod comes with either a device for Near Field Communications (NFC) located in the pylon or a device for Bluetooth Low Energy (BLE) located on the track system. In any case, the communication sequence for the devices is shown below between pod and unmanned aircraft.

Figure 11:
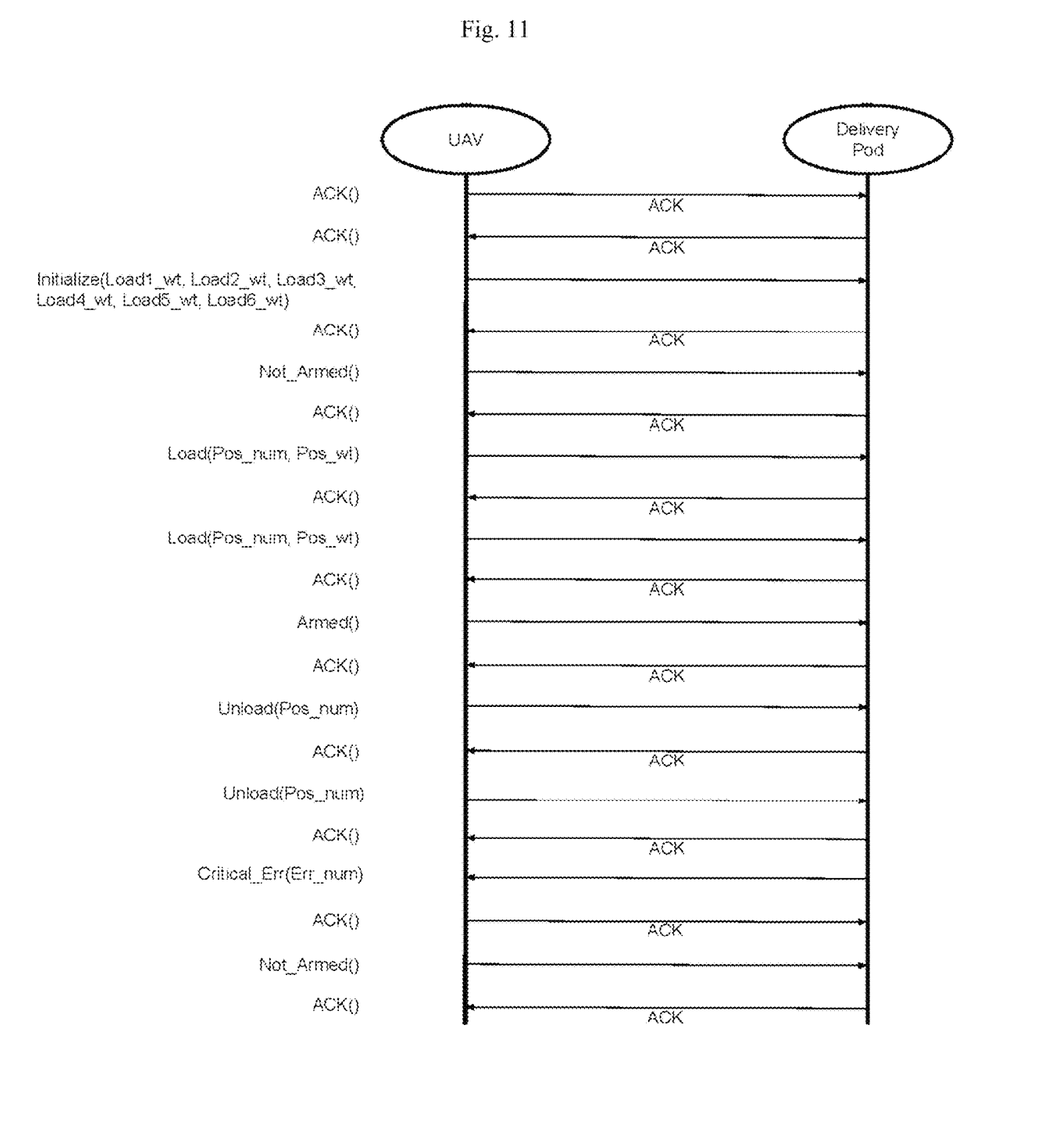
FIG. 11 shows an example of a communication sequence between the pod processor and the UAV processor.

FIG. 11 shows an example of a communication sequence between the pod processor and the UAV processor When the pod is powered and not attached to an unmanned aircraft or a mobile device, it is in listen mode. Upon attachment of the pod to an unmanned aircraft or a mobile device, a wireless encrypted link is negotiated using encryption keys. Once an encrypted wireless link is established, the unmanned aircraft or mobile device is able to send commands to the pod. An example of a communication sequence is shown in FIG. 12.

In this example, two payloads are to be delivered in this mission. After delivering the last payload, a package system error occurs.

Figure 12:
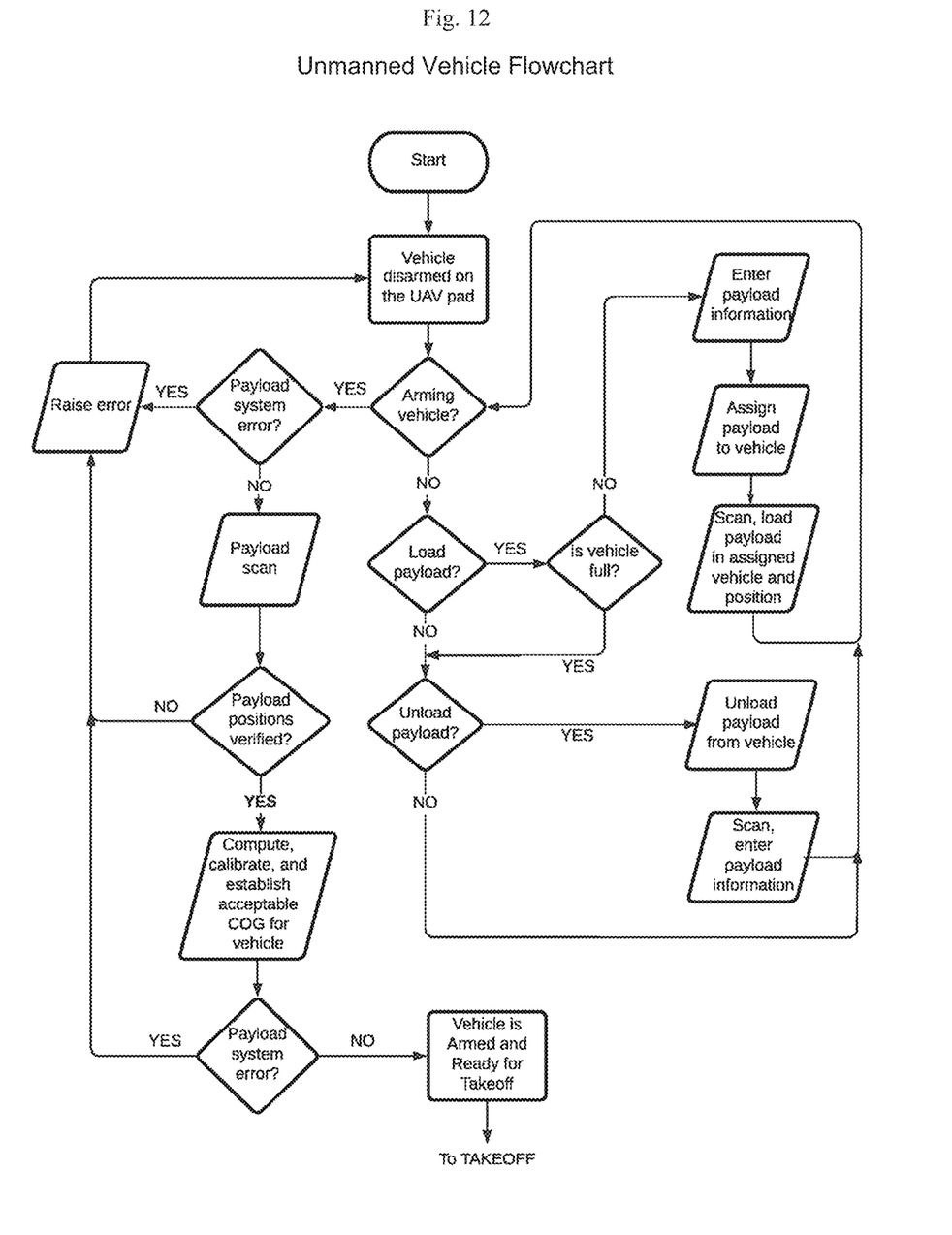
FIG. 12 shows a first part of a system software flowchart.

FIG. 12 shows a first part of a system software flowchart.

Figure 13:
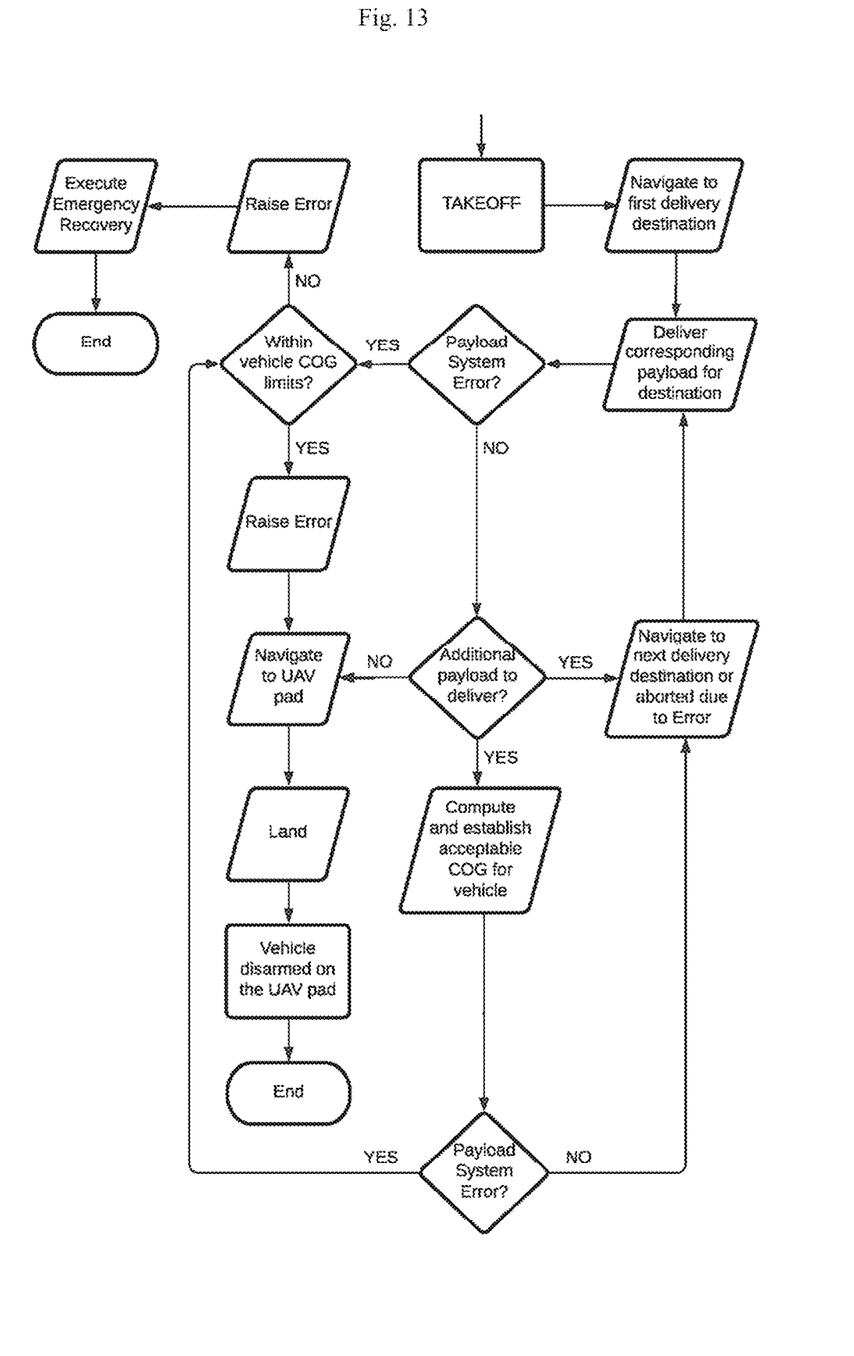
FIG. 13 shows a second part of the system software flowchart.

FIG. 13 shows a second part of the above system software flowchart. The UAV processor sends electric frequencies that represent the location of payload and how the payload should be dispensed or received and is communicated by wireless communication devices to the pod.

The invention claimed is:

1. An unmanned aerial vehicle (UAV) pod device configured to transport payloads, said pod device comprising:
   at least one linear array of said payloads;
   a payload bay configured to store said at least one linear array of said payloads, each said linear array of said payloads constrained on either side by at least one compacting end mechanism, each said linear array of said payloads having a major axis;

at least one pod processor configured to obtain payload weight and linear array location information;

said payload bay further comprising a low friction payload support, and at least one pod processor controlled mechanical actuator configured to move said payloads forward and backward along said major axis over said low friction payload support;

said at least one pod processor configured to use information pertaining to weights and location information of each of said payloads to compute a present center of mass of said pod device, and to use said at least one pod processor controlled mechanical actuator to move at least some of said payloads along said major axis to achieve a predetermined optimal center of mass for maintaining stable flight of an unmanned aerial vehicle (UAV) attached to said pod device, wherein the UAV carries out missions, wherein the transporting of said payloads is based on the carrying out of the missions.

2. The pod device of claim 1, wherein said pod device further comprises said at least one compacting end mechanism, wherein said at least one compacting end mechanism is configured to enable said payloads to be packed in said payload bay in a first position, and configured to constrain movement of said payloads to movement along said major axis in a second position, and to facilitate controlling a position of said payloads in said payload bay.

3. The pod device of claim 2, wherein said at least one pod processor, and said at least one pod processor controlled mechanical actuator, are further configured to:
a) push said payloads together, thereby producing compacted payloads; and
b) move all said compacted payloads in said payload bay along said major axis.

4. The pod device of claim 1, wherein said pod device further comprises illuminators or orientation lights connected to said at least one pod processor; wherein said illuminators or orientation lights are configured to facilitate aligning said UAV with said pod device during docking, thereby facilitating the orientation of said UAV with said pod device, as well as enabling said UAV to identify said pod device.

5. The pod device of claim 1, wherein said pod device further comprises an automatic payload dispensing mechanism configured to independently dispense any given payload of said payloads;
wherein said at least one pod processor is configured to use said payload weight and said linear array location information of an independently dispensed payload of said payloads to recompute said present center of mass of said pod device, and to use said at least one pod processor controlled mechanical actuator to move any remaining payloads of said payloads to achieve said predetermined optimal center of mass for the maintaining of the stable flight of the UAV.

6. The pod device of claim 1, wherein the UAV comprises a processor configured to communicate with said at least one pod processor, and said at least one pod processor uses information received from said UAV processor, wherein said at least one pod processor performs any of determining said predetermined optimal center of mass for the maintaining of the stable flight of the UAV, and to dispense said payloads independently based on the information received from said UAV processor.

7. The pod device of claim 1, wherein said pod device comprises a rapid docking mechanism configured to enable said pod device to attach and detach from said UAV.

8. The pod device of claim 1, wherein said pod device is configured to be attached to an outside of said UAV, and said pod device has an exterior shape configured to minimize aerodynamic drag.

9. The pod device of claim 1, wherein said pod device is configured to be mounted to an inside of said UAV.

10. The pod device of claim 1, wherein said payloads further comprise tags configured to report on weights of said payloads; and said tags are read by a payload scanner to obtain said weights of said payloads, wherein said weights of said payloads are communicated to said pod processor by the payload scanner.

* * * * *